(12) United States Patent     (10) Patent No.: US 8,019,830 B2
Thompson     (45) Date of Patent: Sep. 13, 2011

(54) METHODS AND APPARATUS FOR ACQUIRING FILE SEGMENTS

(76) Inventor: Mark Thompson, Tempe, AZ (US)

( * ) Notice: Subject to any disclaimer, the term of this patent is extended or adjusted under 35 U.S.C. 154(b) by 552 days.

(21) Appl. No.: 12/104,233

(22) Filed: Apr. 16, 2008

(65) Prior Publication Data

US 2008/0263057 A1    Oct. 23, 2008

Related U.S. Application Data

(60) Provisional application No. 60/912,073, filed on Apr. 16, 2007.

(51) Int. Cl.
*G06F 15/16* (2006.01)
(52) U.S. Cl. ............................................... 709/217
(58) Field of Classification Search .................. 709/217
See application file for complete search history.

(56) References Cited

U.S. PATENT DOCUMENTS

| | | | | |
|---|---|---|---|---|
| 5,375,204 A * | 12/1994 | Motoyama et al. | ........... | 345/543 |
| 5,936,659 A * | 8/1999 | Viswanathan et al. | ........ | 725/103 |
| 5,996,015 A * | 11/1999 | Day et al. | ...................... | 709/226 |
| 6,016,315 A * | 1/2000 | Chambers et al. | ............ | 370/378 |
| 6,061,504 A * | 5/2000 | Tzelnic et al. | .................. | 709/219 |
| 6,101,533 A * | 8/2000 | Brandt et al. | ................... | 709/213 |
| 7,024,466 B2 * | 4/2006 | Outten et al. | .................. | 709/219 |
| 7,076,553 B2 * | 7/2006 | Chan et al. | ..................... | 709/226 |
| 7,093,024 B2 * | 8/2006 | Craddock et al. | ............. | 709/238 |
| 7,113,516 B1 * | 9/2006 | Shefi et al. | ..................... | 370/412 |
| 7,324,555 B1 * | 1/2008 | Chen et al. | ..................... | 370/468 |
| 7,327,749 B1 * | 2/2008 | Mott et al. | ..................... | 370/413 |
| 7,486,689 B1 * | 2/2009 | Mott | ............................. | 370/412 |
| 7,555,559 B2 * | 6/2009 | Chapweske | .................. | 709/232 |
| 7,729,368 B2 * | 6/2010 | Saha | ............................. | 370/412 |
| 7,742,485 B2 * | 6/2010 | Zhang | ........................... | 370/400 |
| 7,752,327 B2 * | 7/2010 | Li | ................................. | 709/231 |
| 7,756,880 B2 * | 7/2010 | Sighart et al. | ................. | 707/751 |
| 2002/0078174 A1 * | 6/2002 | Sim et al. | ...................... | 709/219 |
| 2005/0239451 A1 * | 10/2005 | Periyalwar et al. | ........... | 455/425 |
| 2006/0143668 A1 * | 6/2006 | Du Breuil | ....................... | 725/89 |
| 2008/0049254 A1 * | 2/2008 | Phan et al. | .................... | 358/1.16 |
| 2008/0205291 A1 * | 8/2008 | Li et al. | .......................... | 370/254 |
| 2008/0301353 A1 * | 12/2008 | Adams | ........................... | 711/100 |
| 2009/0177792 A1 * | 7/2009 | Guo et al. | ...................... | 709/231 |
| 2009/0202221 A1 * | 8/2009 | Guo et al. | ........................ | 386/68 |
| 2010/0011060 A1 * | 1/2010 | Hilterbrand et al. | .......... | 709/204 |

* cited by examiner

*Primary Examiner* — Wing F Chan
*Assistant Examiner* — Alicia Baturay
(74) *Attorney, Agent, or Firm* — The Noblitt GRoup, PLLC

(57) ABSTRACT

Methods and apparatus for data transfer according to various aspects of the present invention operate in conjunction with acquiring file segments associated with a sequence, and may include requesting a preceding file segment in the sequence from a faster and/or more reliable source, such as a file server, and requesting a subsequent file segment in the sequence from slower or less reliable source, such as a p2p network. The received data may be stored in a ready buffer, a file server buffer, and/or a network buffer according to whether a full set of sequential data has been received and/or the source from which the data is to be requested. File segments may be transferred to the ready buffer when all of the file segments in a sequence and all of the preceding file segments.

28 Claims, 3 Drawing Sheets

METHODS AND APPARATUS FOR ACQUIRING FILE SEGMENTS

CROSS-REFERENCES TO RELATED APPLICATIONS

This application claims the benefit of U.S. Provisional Patent Application No. 60/912,073, filed Apr. 16, 2007.

BACKGROUND OF INVENTION

Increasingly, the Internet and other communication networks are used to transfer data files or streaming data content among multiple different network users. Often, the data files and streamed content comprise video or music, and as a result may require the transfer of substantial amounts of data. Transferring large amounts of data via such a communications network may take a relatively long period of time.

Because it may take a substantial amount of time to transmit an entire video or music file via the network, content is often transmitted using streaming. Streaming content allows for a large data file, such as a movie or music file, to be transmitted to a network user in a way that allows the content to be consumed by the user as the file is transferred. Accordingly, rather than waiting for the entire file download to complete before accessing the file's contents, the content can be accessed while the file is retrieved. Such a method allows a user to access the content at a much earlier time than would ordinarily be allowed if a file download must be completed before consuming its content.

Peer to peer (p2p) networks use the computing power and network bandwidth available to multiple p2p clients to transfer data files and content via the Internet or other communications networks. Accordingly, p2p networks provide efficient methods for transferring large data files such as movie or music files among several network users. P2p networks operate by splitting a large file into multiple segments. For example, some p2p network applications split the file into a series of sequential similarly-sized segments. Other algorithms use more complex methods for splitting the file into segments, for example by hashing the contents of multiple segments together or by applying cryptographic transformations to the file and associated file segments.

Once split into file segments, the file segments may be dispersed among the various users of the p2p network. When a client wishes to retrieve a particular file from the network, the client may retrieve individual file segments from the various p2p clients that have stored those file segments and then may combine them to reconstruct the original file. Accordingly, a p2p client that wants a particular file from the p2p network may retrieve individual file segments from several p2p clients, thus using the bandwidth and processing power of the individual p2p clients rather than that of a single file server or cluster of servers.

Because the content on a p2p network is distributed among several p2p clients, however, it is difficult to ensure consistent file-transfer performance. As new p2p clients join the network and as existing p2p clients leave the network, the availability of file segments constantly changes. Such a change in availability may result in a file download that temporarily stalls or has varying performance. As a result, p2p networks alone may not provide the continuous file transfer rate that is preferred when streaming content via a communications network.

BRIEF DESCRIPTION OF THE DRAWING FIGURES

Representative elements, operational features, applications and/or advantages of the present invention reside in the details of construction and operation as more fully described or otherwise identified. The description may refer to the accompanying drawings, images, figures, etc., wherein like numerals (if any) refer to like parts throughout. Elements, operational features, applications and/or advantages are illustrated by certain exemplary embodiments recited in the disclosure.

Elements and steps in the figures are illustrated for simplicity and clarity and have not necessarily been rendered drawn to scale or according to any particular sequence. For example, steps that may be performed concurrently or in a different order are illustrated in the figures to help to improve understanding of embodiments of the present invention. Likewise, the dimensions of some of the elements in the figures may be exaggerated relative to other elements to help improve understanding of various embodiments of the present invention.

SUMMARY OF THE INVENTION

Methods and apparatus for data transfer according to various aspects of the present invention operate in conjunction with acquiring file segments associated with a sequence, and may include requesting a preceding file segment in the sequence from a faster and/or more reliable source, such as a file server, and requesting a subsequent file segment in the sequence from slower or less reliable source, such as a p2p network. The received data may be stored in a ready buffer, a file server buffer, and/or a network buffer according to whether a full set of sequential data has been received and/or the source from which the data is to be requested. File segments may be transferred to the ready buffer when all of the file segments in a sequence and all of the preceding file segments.

DETAILED DESCRIPTION OF EXEMPLARY EMBODIMENTS

The present descriptions relate to exemplary embodiments of the invention and the inventor's conception of the best mode and are not intended to limit the scope, applicability or configuration of the invention in any way. Rather, the following description is intended to provide convenient illustrations for implementing various embodiments of the invention. Changes may be made in the function and/or arrangement of any of the elements described in the disclosed exemplary embodiments without departing from the spirit and scope of the invention.

Figure 1:
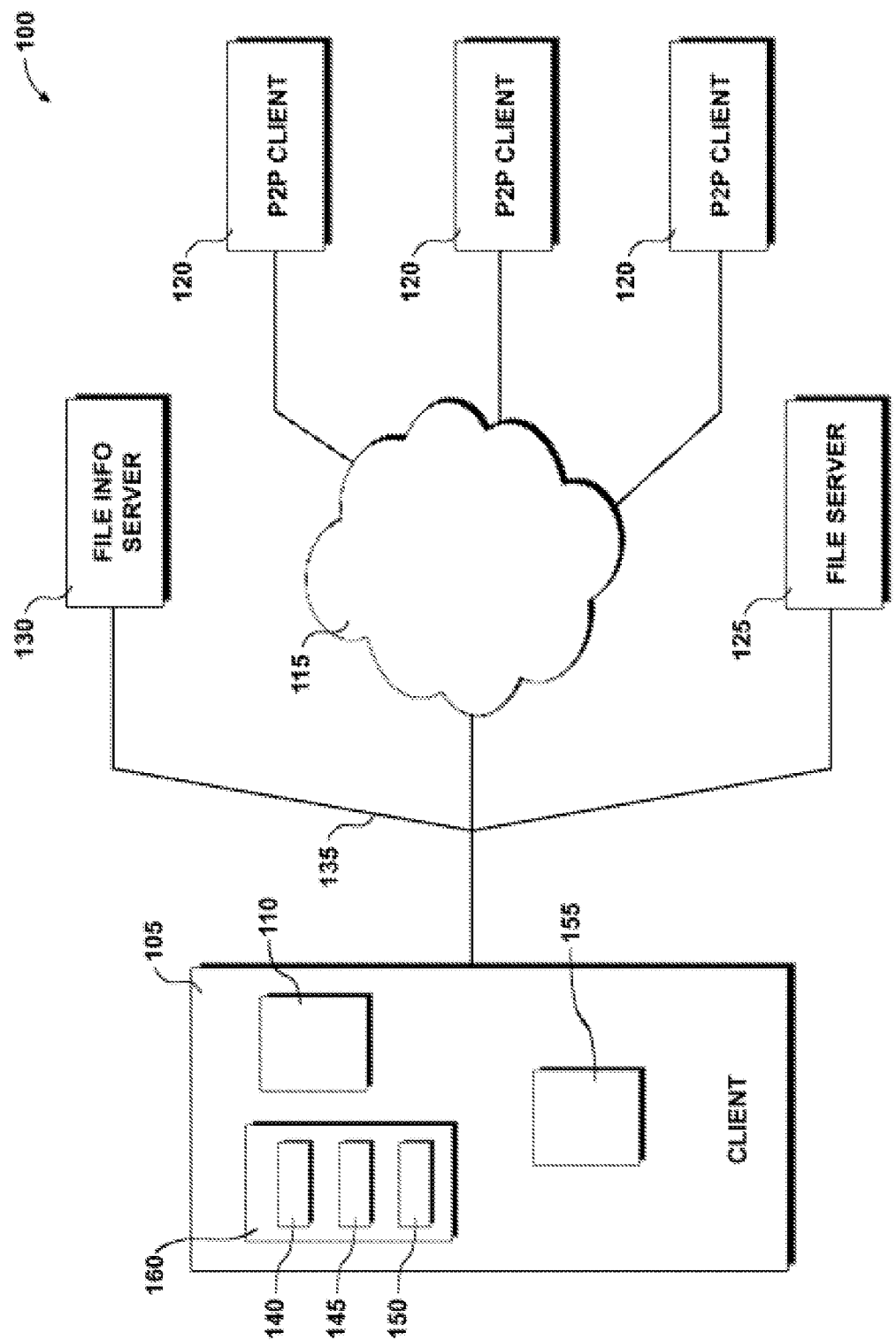
FIG. 1 is a block diagram of a data transfer system according to various aspects of the present invention.

Referring to FIG. 1, a data transfer system 100 according to various aspects of the present invention may comprise multiple computers exchanging data. For example, the present exemplary data transfer system 100 comprises one or more clients 105 connected to each other and one or more p2p networks 115, p2p clients 120, file servers 125, and p2p file info servers 130. Data is transferred among the various clients 105, p2p clients 120, and file servers 125 via the communications medium 135.

The client 105 receives, stores, and/or transmits information via the communications medium 135. The client 105 may comprise any suitable system for communicating via a network or the communications medium 135. For example, one or more clients 105 may comprise conventional computers having a processor and a storage mechanism, such as RAM, hard drives, CD-ROM drives and disks, HD-DVD drives and disks, or other appropriate volatile or non-volatile memory system. Alternatively, the client 105 may comprise a television, stereo, radio, PDA, telephone, personal media device, or other device that receives digital or analog data.

In the present embodiment, the client 105 may execute software applications for requesting and providing information via the medium 135. For example, the client 105 may comprise a conventional computer system that runs an operating system, such as Microsoft Windows, Mac OSX, or Linux, and may execute software and connect to a network. The client 105 may connect to the network in any suitable way, including a network cable connection or a wireless connection. Also, the client 105 may communicate through the network using any appropriate communication protocols, such as TCP/IP, UDP, etc.

The client 105 may run applications that consume file data received via the medium 135. For example, the client 105 may execute a media player 155 program or other suitable application for rendering audiovisual information based on electronic data, such as an Adobe PDF reader, a Flash-based movie player, or a Windows Media Player. The media player 155 may be selected according to the type of content contained within the file and may be configured to consume data accessible to the client 105.

The client 105 may also operate one or more client applications 110 to receive data via the communications medium 135. The client application 110 may comprise any software application or combination of software applications for requesting and/or receiving data via the communications medium 135. For example, the client application 110 may connect to the p2p file info server 130 to retrieve data that describes a file to be retrieved by the client 105 and provides information identifying the p2p network 115 and the file server 125 for retrieving the data.

The client application 110 may use the data from the p2p file info server 130 to connect to a p2p network 115, such as a BitTorrent p2p network, to retrieve segments of the file to be downloaded. While downloading a particular file from the p2p network 115 and p2p clients 120, the client application 110 may identify those file segments that have not yet been retrieved and may connect to other p2p clients 120 to retrieve those file segments. Furthermore, the client application 110 may request specific file segments to retrieve from the p2p network, for example for retrieving file segments in an approximately sequential order.

The client application 110 may also connect to and retrieve segments of the file from the file server 125. For example, the client application 110 may retrieve file segments from the file server 125 in an approximately sequential fashion by requesting specific file segments from the file server 125.

In addition, the client application 110 may select a particular source for requesting a particular file segment. For example, for sequential data such as music or movie files that are to be consumed before the transfer is complete, the client application 110 may request file segments for data early in the sequence from more reliable sources, such as the file server 125, to ensure that the file segments are received as soon as possible to begin playback. The client application 110 may request file segments for data later in the sequence from slower or less reliable sources, such as the p2p network 115.

The client application 110 may also adjust whether file segments should be requested from faster or slower data sources. For example, if playback has advanced to a point where a file segment requested from the p2p network 115 will soon be needed but has not yet been received, the client application 110 may request the file from a faster resource such as the file server 125. Likewise, if a file segment is not likely to be needed soon even jut is early in the sequence, for example if the user has paused the playback process, then the client application 110 may request the file segments from a slower resource such as the p2p network 115.

Upon retrieving file segments from a data source such as the p2p network 115 or the file server 125, the client application 110 may store the file segments in a location that is accessible to the client 105, the media player 155, and/or other applications running on the client 105. For example, the file segments may be stored in a local memory system such as a hard drive, RAM memory, or other suitable volatile or non-volatile memory system. Alternatively, the file segments may be stored on a remote memory system that is accessible to the client 105 via the communications medium 135 and that does not physically reside within the client 105 or in close proximity to the client 105.

In the present embodiment, the client application 110 stores the file segments in one or more buffers. The buffers may comprise portions of memory. In the present embodiment, the buffers reside on the local RAM system and are configured to store file segment data and make that data or a modified version of the data available to other applications having access to at least one of the buffers, such as the media player 155. When storing the file segments in the buffers, the client application 110 may arrange the file segments so they are stored in substantially the same order as the segments are found in the original file.

The client application 110 may perform further manipulation of the file segments before storing them in the buffers. For example, the client application 110 may decrypt the file segments, perform mathematical operations on the file segments (such as Xors against other file segments), verify the integrity of a file segment (such as against a SHA hash of the file segment, or file contents), etc. In alternative configurations, such operations may not be performed until the data contained within the file segments is subsequently retrieved from one of the buffers.

The present embodiment comprises three buffers that may be accessed by the client 105, client application 110, and/or the media player 155. The three buffers comprise a ready buffer 140, a file server buffer 145, and a p2p network buffer 150. Each of the buffers generally comprises a region of memory that may be used to temporarily store data. Each of the buffers may be modified by the client application 110 and data contained in at least one of the buffers may be retrieved by the media player 155. Specifically, the client application 110 may store data in the buffers, modify the size of the buffers, remove data from the buffers, and/or modify the data stored in the buffers, for example by changing the organization of the data stored within the buffers.

In the present embodiment, the client application 110 creates the buffers within a reserved file space 160. The reserved file space 160 comprises a portion of the memory system that is approximately the same size as the file to be retrieved from the data transfer system 100. For example, if the file is 10 MB in size, then a 10 MB reserved file space 160 is created. The buffers are then located within the reserved file space.

In the present embodiment, the beginning of the ready buffer 140 corresponds to the beginning of the reserved file space 160. For example, the ready buffer 140 may comprise the first 100 KB of the reserved file space 160, the file server buffer 145 may comprise the next 1 MB of the reserved file space 160 and the p2p network buffer 150 may comprise the next 3 MB of the reserved file space 160. The relative proportions of the buffers may be selected according to any appropriate criteria, such as the responsiveness of the file server 125 and the p2p network 115.

The ready buffer may be positioned, however, at any suitable location with the reserved file space 160. In addition, the reserved file space 160 may not reside within a contiguous portion of a memory system. For example, the reserved file space 160 may be distributed across multiple memory systems, some of which are accessible directly by the client 105 and others that can only be accessed via the communications medium 135.

In further alternative embodiments, no reserved file space 160 may be defined. In such embodiments, the various buffers may be created on any suitable memory system and may be used to store data retrieved from the data transfer system 100. As data is retrieved from the data transfer system 100, the contents of the file server buffer 145 and p2p network buffer 150 may be transferred into the ready buffer 140 where it may be accessed by the media player 155.

In one embodiment, multiple applications residing on the client 105 may be granted access to any of the buffers and in alternative embodiments, some of the software applications may be able to modify the data contained within the buffers. In a further embodiment, other computer systems, such as other clients 105 or p2p clients 120, may have access to and may be able to modify the contents of the buffers.

A further embodiment may comprise more than three buffers. For example, additional buffers may be used to store data corresponding to different retrieval mechanisms. For example, a buffer may be used to store data retrieved from a preferred p2p network 115, while an additional buffer may be used to store data retrieved from another p2p network 115. Furthermore, additional buffers may be used to store data retrieved from additional file servers 125 or other data sources.

The ready buffer 140 stores data that has been retrieved from the p2p network 115, the file server 125, or other source, and that has been arranged to comprise a substantially complete sequence of the original file retrieved by the client 105. For example, the ready buffer 140 may contain data that represents a portion of a movie that comprises multiple sequential file segments that have been successfully retrieved, and all of the preceding file segments have already been received. Accordingly, the ready buffer 140 contains data that may be immediately accessed by the user, for example via a media player 155 application, to view the movie or otherwise consume the sequential data from the beginning of the file.

The file server buffer 145 stores data file segments retrieved from the file server 125. The p2p network buffer 150 stores data file segments retrieved from the p2p network 115. When storing the file segments in the file server buffer 145 and the p2p network buffer 150, the client application 110 may store the data in substantially the same sequence that the file segments are found within the original file. However, in alternative embodiments, the file segments may be stored within the buffer in a different order, for example in the same order in which the file segments are retrieved from the file server 125 or p2p network 115. In such an embodiment, the sequence of the file segments may be altered by the client application 110 so as to make them easily consumed by the media player 155. For example, the file segments may be organized in substantially the same order as they are found in the file being distributed.

The media player 155 may retrieve data from the ready buffer 140 and may use the data in performing a function, such as playing a video or music file. The media player 155 may be further configured to modify the data contained with one of the buffers. For example, the media player 155 may be configured to retrieve additional data from the file server buffer 145 or the p2p network buffer 150 upon consuming all data available within the ready buffer 140. The media player 155 may also communicate with the client application 110, for example to indicate how much content has been consumed by the media player 155 in addition to the current status of the media player 155. For example, the media player 155 may communicate to the client application 110 whether it is currently playing or is in a paused state, the portion of the file that is playing, the speed at which data is consumed, etc.

The client application 110 may modify the manner in which it retrieves content via the communications medium 135 from the file server 125 and/or the p2p network 115, such as in response to the information provided by the media player 155. For example, if the media player 155 is paused, the client application 110 may reduce the number of file segments requested from the file server 125 and/or increase the number of file segments requested from the p2p network 115. Conversely, if the media player 155 has consumed all or nearly all of the data in the ready buffer 140, the client application 110 may increase the number of file segments requested from the file server 125 and/or decrease the number of file segments requested from the p2p network 115.

The client application 110 may adjust the source for requesting file segments in any appropriate manner. In the present embodiment, the client application 110 requests file segments from a particular source according to which buffer is associated with the file segment. For example, data missing from the file server buffer 145 may be demanded soon by another application like the media player 155, so the client application 110 may request the missing data from a fast and/or reliable source, such as the file server 125. Data in the p2p network buffer 150 is less likely to be urgently needed, so the client application may request missing file segments from the p2p network 115.

The client application 110 may also change the configuration of the buffers in response to the information provided by the media player 155. For example, to adjust the source from which file segments are requested, the client application 110 may adjust the size and/or placement of the file server buffer 145 and p2p network buffer 150 to include or remove portions of the data.

The communications medium 135 may comprise any suitable medium for transferring information. For example, the communications medium 135 may comprise the Internet or other suitable network, such as a local area network.

In the present embodiment, the communications medium 135 facilitates operation of the p2p network 115 between the various devices configured to exchange information, such as a multiple computers that use the BitTorrent protocol to distribute digital files. The p2p network 115 may, however, comprise a network of computers using alternative systems for communicating and distributing files among peers. The p2p network 115 communicates with the various clients 105, 120 such that the p2p clients 120 may retrieve file segments from the p2p network 115. Any appropriate system and device may be connected to the p2p network 115, such as computers, servers, entertainment systems, data sources, and other servers.

The data embodied within the file segments that are communicated via the communications medium 135 between the client 105, p2p clients 120, and file server 125 may comprise any suitable data capable of being communicated via the communications medium 135. For example, the data may comprise a single digital file or collection of files that may comprise video files, music files, or other collections of digital information. Alternatively, the data may comprise a sequence of data embodying a video or music broadcast. The stream may comprise a quasi-continuous flow of data made available via the communications medium 135 and that may be distributed by the p2p network 115 and p2p clients 120 and the file server 125. In an alternative embodiment, the data may comprise analog information that may be distributed via the communications medium 135, for example comprising an analog video or music broadcast.

The present embodiment operates in conjunction with multiple p2p clients 120 that are connected to the communications medium 135 and are configured to communicate with the client 105, p2p network 115, p2p file info server 130, file server 125 and other components of the data transfer system 100. The p2p clients 120 may comprise any suitable devices capable of communication via the communications medium 135. In the present embodiment, the p2p clients 120 comprise conventional computers having a processor and a storage mechanism, such as RAM, hard drives, CD-ROM drives and disks, HD-DVD drives and disks, or other appropriate volatile or non-volatile memory system. Alternatively, the p2p clients 120 may comprise a television, stereo, radio, PDA, personal media device, or other device that receives digital or analog data.

In the present embodiment, the p2p clients 120 may execute software applications for requesting and providing information to other p2p clients 120 and the client 105 via the medium 135. For example, the p2p clients 120 may comprise conventional computer systems that run an operating system, such as Microsoft Windows, Mac OSX, or Linux, and may execute software and connect to a network. The p2p client 120 may connect to the network in any suitable way, including a network cable connection or a wireless connection. Also, the p2p clients 120 may communicate through the network using any appropriate communication protocols, such as TCP/IP, IMP, etc.

In the present embodiment, the p2p clients 120 execute p2p network software for communicating and transferring information between the multiple p2p clients 120 and the client 105. For example, the p2p clients 120 may be configured to execute BitTorrent client software and to communicate using BitTorrent protocols.

The p2p file info server 130 is connected to the communications medium 135 and is configured to communicate at least with the client 105. In alternative embodiments, the p2p file info server may be further configured to communicate with the p2p clients 120, other elements of the p2p network 115 and the file server 125. The p2p file info server 130 may comprise one or more conventional computers having a processor and a storage mechanism or applications running on such computers that communicate with the client 105, and/or p2p clients 120 through the communications medium 135.

The p2p file info server 130 transmits data to the clients 105, 120 that identify the particular file to be retrieved from the p2p network and/or the file server 125. The data transmitted by the p2p file info server 130 may describe the file to be retrieved by the client 105 and provide data that allows the client application 110 to retrieve the contents of the file from the p2p network 115 and p2p clients 120 or the file server 125. In the present embodiment, the data to be retrieved from the p2p file info server 130 may comprise a torrent file that contains sufficient data to allow the client application 110 to retrieve the file from a p2p network 115 and p2p clients 120 or other source, such as the file server 125.

For example, the data may contain the IP addresses of both the file server 125 and one or more trackers that are responsible for maintaining a list of p2p clients 120 that are currently distributing the file segments. The data provided by the p2p file info server 130 may also contain information such as the size of the file, a SHA hash of the file's contents, etc. In one embodiment, for example, the p2p network 115 comprises a BitTorrent network, and the data distributed by the p2p file info server 130 comprises a torrent file that further contains information that allows the client application 110 to communicate and retrieve data from the file server 125.

The file server 125 is connected to the communications medium 135 and is capable of communicating via the medium with the client 105, p2p clients 120 of the p2p network, and p2p file info server 130. The present embodiment includes one or more file servers 125 that may operate as data sources and provide other appropriate functions. The file server 125 may comprise any relatively reliable and/or fast-responding data source configured to communicate via the communications medium 135. For example, the file server 125 may comprise hardware, software, and/or networking components configured to receive and process requests from the clients 105 and/or client application 110 and provide a website or other Internet-based interface which is accessible by the client 105 and p2p clients 120 and the client application 110. In one embodiment, the file server 125 comprises a computer running an operating system (i.e. MS Windows, Mac OSX, Linux, etc.) and a web server (i.e. Apache, etc.). In an alternative embodiment, the file server 125 may also store information that describes the file that is to be delivered to the client 105, for example, by providing the functionality of the p2p file info server 130.

The file server 125 transmits file segments of the file to the client 105 via the communication medium 135. The file segments comprise segments of the file to be transmitted to the client 105 and may be created by any suitable method. For example, the file server may transmit file segments that are created using a substantially similar method as the p2p clients 120 employ to split a particular file into file segments. Alternatively, the file server 125 may use a different method of splitting the file into file segments. For example, the size of the file segments may be modified based on a determination of the computing and/or transmission power of the file server 125 and/or the client 105 and the network bandwidth of the communication medium 135 connecting the client 105 and the file server 125. The file server 125 is capable of transmitting a particular file segment in response to a request for the file segment from the client application 110.

Figure 2:
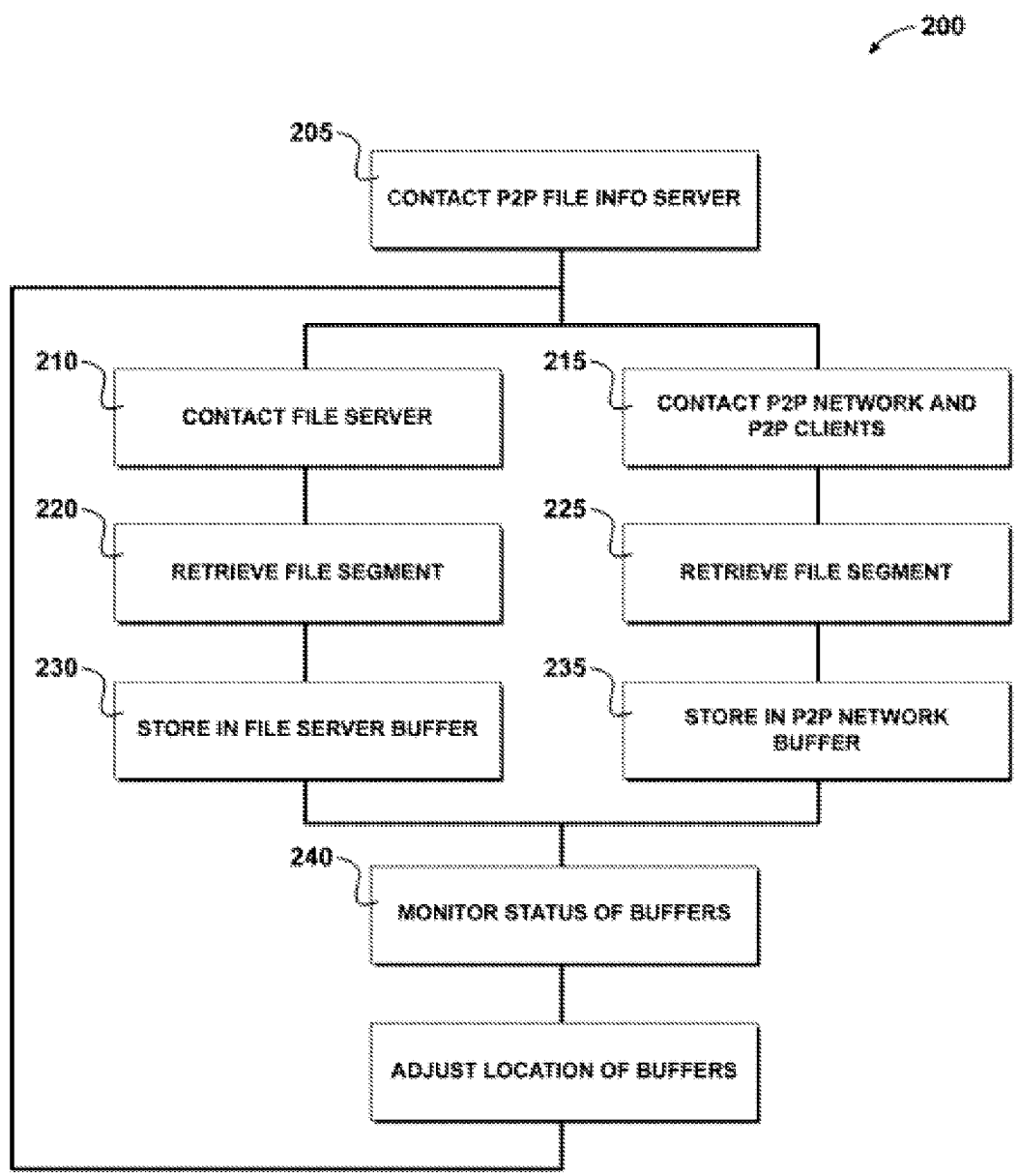
FIG. 2 is a flow diagram of a data transfer system according to various aspects of the present invention.

Referring to FIG. 2, the data transfer system 100 may transfer information in response to a request initiated by the client application 110 residing on the client 105. The request may comprise a communication transmitted from the client 105 to the p2p file info server 130 requesting data that describes a file to be retrieved from the data transfer system 100 (205). The data retrieved from the p2p file info server 130 may contain information describing file servers 125 from which some or all of the file segments comprising the file may be retrieved. The data also provides information allowing the client application 110 to begin retrieving file segments from the p2p network 115 and the p2p clients 120.

The client application 110 may allocate space on either a locally accessible memory system or a remote memory system accessible via the communications medium 135 that comprises the three buffers. In an alternative embodiment, however, the buffers may be created only as needed, or may be configured before the client application 110 contacts the p2p tile info server 130. The size of each of the buffers in addition to its storage location may be determined based upon information retrieved from the p2p file info server 130. For example, the buffers may be allocated a particular size based upon the site of the file to be downloaded, the network performance and computing power of the file server 125 and any other data point available to the client application 110.

Figure 3:
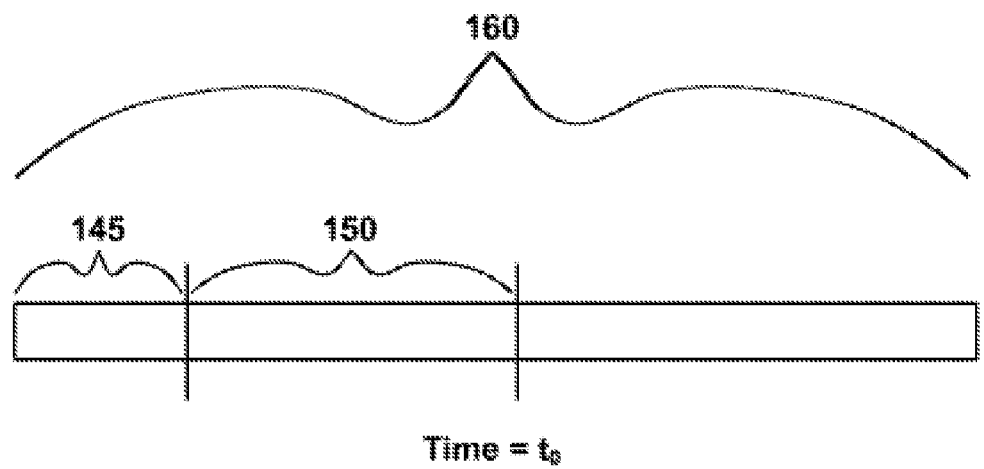
FIG. 3 is a diagram illustrating operation of buffers embodied within the data transfer system.
Figure 3:
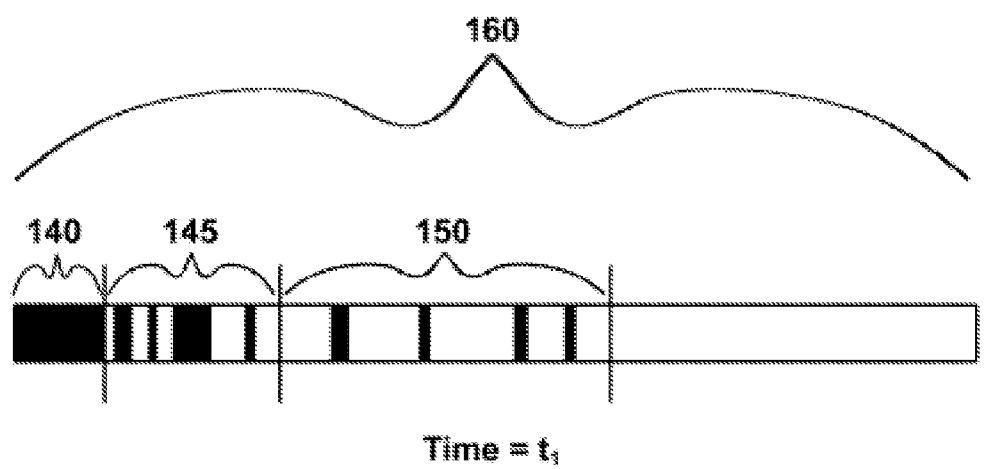

In the present embodiment, prior to defining the buffers, a reserved file space 160 is initially defined. Within the reserved file space 160, the three buffers are defined. For example, with reference to FIG. 3, if the file to be downloaded is 10 MB in size, a 10 MB area 160 is reserved in memory by the client application 110. Initially, the ready buffer 140 is defined as the first 0 KB of the reserved storage area. However, as the download progresses, the size of the ready buffer 140 may be expanded depending upon the number of file segments retrieved by the client application 110.

Next, adjacent the ready buffer 140, a 1 MB file server buffer 145 may be defined. Finally, adjacent the file server buffer 145, a 3 MB p2p network buffer 150 may be defined. Accordingly, as data is retrieved from either the file server 125 or the p2p network 115, it can be stored into its related buffer. Each of the buffers may be set to occupy any suitable amount of space depending upon the application. Furthermore, the buffers need not be allocated within a reserved file space 160. Instead, the buffers may be established in non-contiguous portions of memory with no creation of a reserved file space 160 being necessary.

Upon receiving the data from the p2p file info server 130, the client application may contact the file server 125 (210) and the p2p clients 120 (215) of the p2p network 115 to begin retrieving segments of the file. Having established the location and size of the buffers, the client application 110 can begin retrieving data to populate the various buffers. In the present embodiment, the defined location of each of the buffers corresponds to a particular portion of the file to be retrieved by the client application 110. Accordingly, the client application 110 may retrieve file segments that fall within the region occupied by a particular buffer using the method identified by that buffer.

For example, referring again to FIG. 2, if the file server buffer 145 is defined as the first 1 MB of the reserved file space 160, the client application 110 connects to the file server 125 and retrieves file segments that fall within the first 1 MB of the file to be retrieved (220). As the file segments are retrieved, they are stored in the file server buffer 145 (230). Similarly, because the p2p network buffer 150 corresponds to the 3 MB directly following the file server buffer 145 in the reserved file space 160, the client application 110 connects to the p2p network 115 and begins retrieving file segments from the various p2p clients 120 that fall within the same 3 MB portion of the file to be retrieved (225). Upon retrieving the file segments, they may be stored in the p2p network buffer 150 (235). Accordingly, the client application 110 begins populating both buffers at approximately the same time. In the present embodiment, the file segments are stored in their respective buffers in the same order in which they appear in the file that is downloaded. In alternative embodiments, however, the file segments may be stored in the buffers in approximately the same order in which they are retrieved from either the file server 125 or the p2p network 115. They may then be arranged by the client application 110 or the media player 155.

In the present embodiment, while populating the various buffers with the retrieved file segments, the client application 110 may continuously monitor the buffers and modify their contents, size, and location (240). For example, with reference to FIG. 3, as more file segments are retrieved (see Time=t1, shaded areas indicate downloaded file segments), the ready buffer 140 is expanded to incorporate those areas of the reserved file space 160 that are populated with contiguous data as measured from the beginning of the file. Accordingly, by expanding the ready buffer 140, additional content is made available to the media player 155. As a result, the file server buffer 145 is moved to incorporate subsequent file segments of the file. The position of the p2p network buffer 150 is also modified to incorporate additional subsequent file segments within the file.

In an alternative embodiment, the size and configuration of the buffers may be altered depending on the performance of the data transfer system 100. For example, if the media player 155 is paused so that additional content is not immediately required, the size of the file server buffer 145 may be decreased and the size of the p2p network buffer 150 may be increased. Accordingly, use of the file server's 125 consistent and reliable connection is minimized, while use of the p2p network's 115 potentially greater bandwidth, but less predictable, capabilities are maximized. Thus, while paused, the data transfer system 100 may rely upon the p2p network 115 to provide a majority of the file content, while minimizing reliance on the file server 125. When use of the media player 155 is resumed, the buffers can be re-adjusted to their original configurations.

In alternative embodiments where the buffers do not reside within a reserved file space 160, as data is retrieved from the p2p network 115 or the file server 125, the data may be moved between the buffers. For example, as file segments are retrieved from the file server 125 and populate the beginning of the file server buffer 145, those file segments may be transferred into the ready buffer 140 so they may be consumed by the media player 155.

In the foregoing specification, the invention has been described with reference to specific exemplary embodiments. Various modifications and changes may be made without departing from the scope of the present invention as set forth in the exemplary embodiments. The specification and figures are to be regarded in an illustrative manner, rather than a restrictive one and all such modifications may be included within the scope of the present invention. For example, the steps recited in any method or process embodiments may be executed in any appropriate order and are not limited to the specific order presented in the embodiments. Additionally, the components and/or elements recited in any apparatus embodiment may be otherwise assembled or operationally configured to produce substantially the same result and are accordingly not limited to the specific configurations recited in the embodiments.

Various benefits, advantages, and solutions to problems have been described with regard to particular embodiments. Any benefit, advantage, solution to problems or any element that may cause any particular benefit, advantage, or solution to occur or to become more pronounced are not to be construed as critical, required, or essential features or components of any or all the embodiments.

Furthermore, the terms 'first', 'second', and the like herein, if any, are used for distinguishing between similar elements and not necessarily for describing a sequential or chronological order. Moreover, the terms 'front', 'back', 'top', 'bottom', 'over', 'under', and the like in the disclosure and/or in the provisional embodiments, if any, are generally employed for descriptive purposes and not necessarily for comprehensively describing exclusive relative position. Any of the preceding terms so used may be interchanged under appropriate circumstances such that various embodiments of the invention, for example, are capable of operation in other configurations and/or orientations than those explicitly illustrated or otherwise described The terms "comprises", "comprising", "including", or any variation thereof, are intended to reference a non-exclusive inclusion, such that a process, method, article, composition, or apparatus that comprises one or more elements does not include only the elements recited, but may also include other elements not expressly listed or inherent to such process, method, article, composition or apparatus. Other combinations and/or modifications of the described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the disclosed invention.

The invention claimed is:

1. A computer-implemented method of acquiring file segments associated with a sequence via a program operating on a computer and a peer-to-peer (p2p) network, comprising:
   requesting a preceding file segment in the sequence from a file server;
   requesting a subsequent file segment in the sequence from the p2p network;
   creating a file server buffer and a network buffer in adjacent portions of a contiguous space in a memory;
   storing a file segment received from the file server in the file server buffer;
   and
   storing a file segment received from the p2p network in the network buffer.

2. A computer-implemented method of acquiring file segments according to claim 1, wherein requesting the preceding file segment comprises:
   identifying a nonreceived file segment corresponding to a sequence location in the file server buffer; and
   requesting the nonreceived file segment from the file server.

3. A computer-implemented method of acquiring file segments according to claim 1, wherein requesting the subsequent file segment comprises:
   identifying a nonreceived file segment corresponding to a sequence location in
   the network buffer; and
   requesting the nonreceived file segment from the p2p network.

4. A computer-implemented method of acquiring file segments according to claim 1, further comprising designating a file segment as ready for consumption when a set of preceding file segments in the sequence has been received.

5. A computer-implemented method of acquiring file segments according to claim 4, wherein designating the file segment as ready for consumption comprises expanding a ready buffer to include the storage location of the file segment ready for consumption.

6. A computer-implemented method of acquiring file segments according to claim 5, further comprising adjusting a boundary of at least one of the file server buffer and the network buffer in response to expanding the ready buffer.

7. A computer-implemented method of acquiring file segments according to claim 6, further comprising requesting additional file segments from the file server, wherein the additional file segments correspond to locations in the file server buffer associated with nonreceived file segments.

8. A computer-implemented method of acquiring file segments according to claim 4, wherein designating the file segment as ready for consumption comprises transferring the file segment to a memory location in a ready buffer.

9. A computer-implemented method of acquiring file segments according to claim 1, further comprising expanding the network buffer and shrinking the file server buffer in response to a reduction in a consumption rate of the file segments.

10. A non-transitory computer-readable medium storing instructions executable by a computer for acquiring file segments associated with a sequence, wherein the instructions are configured to cause a computer to:
    request a preceding file segment in the sequence from a file server;
    request a subsequent file segment in the sequence from a peer-to-peer (p2p) network;
    create a file server buffer and a network buffer in adjacent portions of a contiguous space in a memory;
    store a file segment received from the file server in the file server buffer;
    and
    store a file segment received from the p2p network in the network buffer.

11. A non-transitory computer-readable medium storing instructions executable by a computer for acquiring file segments according to claim 10, wherein the instructions are configured to cause the computer to request the preceding file segment by:
    identifying a nonreceived file segment corresponding to a sequence location in
    the file server buffer; and
    requesting the nonreceived file segment from the file server.

12. A non-transitory computer-readable medium storing instructions executable by a computer for acquiring file segments according to claim 10, wherein the instructions are configured to cause the computer to request the preceding file segment by:
    identifying a nonreceived file segment corresponding to a sequence location in
    the network buffer; and
    requesting the nonreceived file segment from the p2p network.

13. A non-transitory computer-readable medium storing instructions executable by a computer for acquiring file segments according to claim 10, wherein the instructions are further configured to cause the computer to designating a file segment as ready for consumption when a set of preceding file segments in the sequence has been received.

14. A non-transitory computer-readable medium storing instructions executable by a computer for acquiring file segments according to claim 13, wherein the instructions are configured to cause the computer to designate the file segment as ready for consumption by expanding a ready buffer to include the storage location of the file segment ready for consumption.

15. A non-transitory computer-readable medium storing instructions executable by a computer for acquiring file segments according to claim 14, wherein the instructions are further configured to cause the computer to adjust a boundary of at least one of the file server buffer and the network buffer in response to expanding the ready buffer.

16. A non-transitory computer-readable medium storing instructions executable by a computer for acquiring file segments according to claim 15, wherein the instructions are further configured to cause the computer to request additional file segments from the file server, wherein the additional file segments correspond to locations in the file server buffer associated with nonreceived file segments.

17. A non-transitory computer-readable medium storing instructions executable by a computer for acquiring file segments according to claim 13, wherein the instructions are configured to cause the computer to designate the file segment as ready for consumption comprises transferring the file segment to a ready buffer.

18. A non-transitory computer-readable medium storing instructions executable by a computer for acquiring file segments according to claim 10, wherein the instructions are further configured to cause the computer to expand the network buffer and shrink the file server buffer in response to a reduction in a consumption rate of the file segments.

19. A non-transitory computer-readable medium storing instructions executable by a machine, wherein the instructions cause the machine to execute a method for acquiring file segments associated with a sequence comprising:
    requesting a preceding file segment in the sequence from a file server;
    requesting a subsequent file segment in the sequence from a peer-to-peer (p2p) network;
    creating a file server buffer and a network buffer in adjacent portions of a contiguous space in a memory;
    storing a file segment received from the file server in the file server buffer; and
    storing a file segment received from the p2p network in the network buffer.

20. A non-transitory computer-readable medium storing instructions according to claim 19, wherein requesting the preceding file segment comprises:
    identifying a nonreceived file segment corresponding to a sequence location in
    the file server buffer; and
    requesting the nonreceived file segment from the file server.

21. A non-transitory computer-readable medium storing instructions according to claim 19, wherein requesting the preceding file segment comprises:
    identifying a nonreceived file segment corresponding to a sequence location in
    the network buffer; and
    requesting the nonreceived file segment from the p2p network.

22. A non-transitory computer-readable medium storing instructions according to claim 19, further comprising designating a file segment as ready for consumption when a set of preceding file segments in the sequence has been received.

23. A non-transitory computer-readable medium storing instructions according to claim 22, wherein designating the file segment as ready for consumption comprises expanding a ready buffer to include the storage location of the file segment ready for consumption.

24. A non-transitory computer-readable medium storing instructions according to claim 23, further comprising adjusting a boundary of at least one of the file server buffer and the network buffer in response to expanding the ready buffer.

25. A non-transitory computer-readable medium storing instructions according to claim 24, further comprising requesting additional file segments from the file server, wherein the additional file segments correspond to locations in the file server buffer associated with nonreceived file segments.

26. A non-transitory computer-readable medium storing instructions according to claim 22, wherein designating the file segment as ready for consumption comprises transferring the file segment to a memory location in a ready buffer.

27. A non-transitory computer-readable medium storing instructions according to claim 19, further comprising expanding the network buffer and shrinking the file server buffer in response to a reduction in a consumption rate of the file segments.

28. A computer-implemented method of retrieving file segments having a sequence via a program operating on a computer and a peer-to-peer (p2p) network, comprising:
    creating a ready buffer, a file server buffer, and a network buffer in adjacent portions of a contiguous space in a memory, wherein:
    the file server buffer comprises memory locations corresponding to a plurality of preceding file segments in the sequence;
    the network buffer comprises memory locations corresponding to a plurality of subsequent file segments in the sequence;
    requesting at least one of the preceding file segments from a file server;
    requesting at least one of the subsequent file segments from the p2p network;
    storing the preceding file segments in the file server buffer;
    storing the subsequent file segments in the network buffer;
    transferring the file segments to the ready buffer where all of the file segments preceding the file segments to be transferred have been received.

* * * * *